US009917526B2

(12) United States Patent
Sidapara

(10) Patent No.: US 9,917,526 B2
(45) Date of Patent: Mar. 13, 2018

(54) METHOD OF DRIVING FETS IN SATURATING SELF-OSCILLATING PUSH-PULL ISOLATED DC-DC CONVERTER

(71) Applicant: Murata Manufacturing Co., Ltd., Nagaokakyo-shi, Kyoto-fu (JP)

(72) Inventor: Rohit Sidapara, Milton Keynes (GB)

(73) Assignee: MURATA MANUFACTURING CO., LTD., Kyoto (JP)

(*) Notice: Subject to any disclaimer, the term of this patent is extended or adjusted under 35 U.S.C. 154(b) by 0 days.

(21) Appl. No.: 15/518,588

(22) PCT Filed: Oct. 23, 2015

(86) PCT No.: PCT/US2015/057047
§ 371 (c)(1),
(2) Date: Apr. 12, 2017

(87) PCT Pub. No.: WO2016/065223
PCT Pub. Date: Apr. 28, 2016

(65) Prior Publication Data
US 2017/0250611 A1    Aug. 31, 2017

Related U.S. Application Data

(60) Provisional application No. 62/068,012, filed on Oct. 24, 2014.

(51) Int. Cl.
H02M 3/335    (2006.01)
H02M 3/338    (2006.01)
(Continued)

(52) U.S. Cl.
CPC ......... H02M 3/3384 (2013.01); H02M 1/083 (2013.01); H02M 1/36 (2013.01); H02M 2001/0048 (2013.01)

(58) Field of Classification Search
CPC ..... H02M 3/337; H02M 3/338; H02M 3/3387
(Continued)

(56) References Cited

U.S. PATENT DOCUMENTS 2,916,704 A * 12/1959 Morey, Jr. ........... H02M 3/3388
                                                  331/113 A
2,950,446 A *  8/1960 Humez ................ H02M 3/3388
                                                  331/113 A
(Continued)

FOREIGN PATENT DOCUMENTS

CN    102082526 A    6/2011
JP    03-183369 A    8/1991
(Continued)

OTHER PUBLICATIONS

Official Communication issued in International Patent Application No. PCT/US2015/057047, dated Feb. 4, 2016.

Primary Examiner — Gary Nash
(74) Attorney, Agent, or Firm — Keating & Bennett, LLP

(57) ABSTRACT

A converter includes a DC input; a transformer including first and second primary windings, first and second secondary windings, and first and second feedback windings; a first field-effect transistor; a second field-effect transistor; and a drive circuit connected to the first and second field-effect transistors. The drive circuit includes a bias circuit that applies a bias voltage to gates of the first and second field-effect transistors via the first and second feedback windings during start-up of the converter, wherein the bias voltage is reduced to zero or substantially zero after start-up of the converter; and a reset circuit that resets the bias circuit when the converter is turned off. The converter is a self-oscillating push-pull DC-DC converter.

7 Claims, 2 Drawing Sheets

(51) Int. Cl.
*H02M 1/08* (2006.01)
*H02M 1/36* (2007.01)
*H02M 1/00* (2006.01)

(58) Field of Classification Search
USPC .... 363/21.04, 21.05, 21.08, 21.1, 21.16, 22, 363/23
See application file for complete search history.

(56) References Cited

U.S. PATENT DOCUMENTS

| | | | | |
|---|---|---|---|---|
| 2,968,738 | A | * | 1/1961 | Pintell ................ G05F 1/38 307/150 |
| 3,020,491 | A | * | 2/1962 | Kurtz ................ H02M 3/3384 331/113 A |
| 3,777,248 | A | * | 12/1973 | Vermolen ........... H02M 3/3388 331/113 A |
| 4,464,710 | A | | 8/1984 | Gruber |
| 2006/0250822 | A1 | * | 11/2006 | Nakagawa ............ H02M 1/40 363/16 |
| 2010/0231313 | A1 | * | 9/2010 | Kitamura ............ H02M 3/338 331/117 FE |
| 2013/0242620 | A1 | * | 9/2013 | Hosotani ............. H02M 1/36 363/21.09 |

FOREIGN PATENT DOCUMENTS

| | | |
|---|---|---|
| JP | 06-276748 A | 9/1994 |
| JP | 10-312891 A | 11/1998 |
| WO | 2014/058966 A1 | 4/2014 |

* cited by examiner

METHOD OF DRIVING FETS IN SATURATING SELF-OSCILLATING PUSH-PULL ISOLATED DC-DC CONVERTER

BACKGROUND OF THE INVENTION

1. Field of the Invention

The present invention relates to power conversion, and more specifically, the present invention relates to a circuit and method for driving FETs (field-effect transistors) in a saturating self-oscillating push-pull isolated DC-DC converter.

2. Description of the Related Art

Bipolar junction transistors (BJTs) have been used as driving switches in saturating self-oscillating push-pull isolated DC-DC converters. However, because BJTs are current-controlled devices, they generally exhibit larger switching losses than voltage-controlled devices, such as MOSFETs (metal-oxide-semiconductor field-effect transistors). These switching losses become a significant source of power loss in a saturating self-oscillating push-pull isolated DC-DC converter that is operated at relatively high switching frequencies.

Accordingly, when BJTs are used in a saturating self-oscillating push-pull isolated DC-DC converter, the transformer of the DC-DC converter must be designed with a high number of primary turns and/or a large cross-sectional core area to lower the switching frequency. Furthermore, BJTs typically have gains that vary widely with temperature, which can result in a number of problems, including difficulty during start-up at low operating temperatures.

SUMMARY OF THE INVENTION

The preferred embodiments of the present invention provide a circuit and method that drive switches of a saturating self-oscillating push-pull isolated DC-DC converter with relatively high switching frequencies, which allows the overall size of the transformer to be reduced. Further, the preferred embodiments of the present invention require a relatively small number of turns on the primary winding of the transformer, and switching losses are reduced by the preferred embodiments of the present invention by using FETs, in particular, MOSFETs, that require very little gate-drive current. The preferred embodiments of the present invention also provide stable operation of the DC-DC converter over a wide temperature range, as well as reliable start-up at low temperatures.

A converter includes a DC input; a transformer including first and second primary windings, first and second secondary windings, and first and second feedback windings; a first field-effect transistor; a second field-effect transistor; and a drive circuit connected to the first and second field-effect transistors. The drive circuit includes a bias circuit that applies a bias voltage to gates of the first and second field-effect transistors via the first and second feedback windings during start-up of the converter, wherein the bias voltage is reduced to zero or substantially zero after start-up of the converter; and a reset circuit that resets the bias circuit when the converter is turned off. The converter is a self-oscillating push-pull DC-DC converter.

The self-oscillating push-pull DC-DC converter is a Royer oscillator.

The bias circuit preferably includes a capacitor and a resistor connected in series across the DC input and ground. A first terminal of the capacitor is preferably connected to the DC input. A second terminal of the capacitor is preferably connected to a first terminal of the resistor and a center-tap of the first and second feedback windings. The first terminal of the resistor is preferably connected to the second terminal of the capacitor and the center-tap of the first and second feedback windings. A second terminal of the resistor is preferably connected to ground. The resistor preferably reduces a voltage at the center-tap of the first and second feedback windings to ground or substantially to ground after the capacitor is fully charged.

The reset circuit preferably includes a resistor connected in parallel with the bias circuit between the DC input and ground.

The drive circuit preferably further includes a first resistor connected between the gate of the first field-effect transistor and the first feedback winding; and a second resistor connected between the gate of the second field-effect transistor and the second feedback winding.

The converter preferably further includes a capacitor connected to the first and second secondary windings.

The converter preferably further includes a rectifier circuit connected to the first and second secondary windings. The rectifier circuit preferably includes first and second diodes.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

Figure 1:
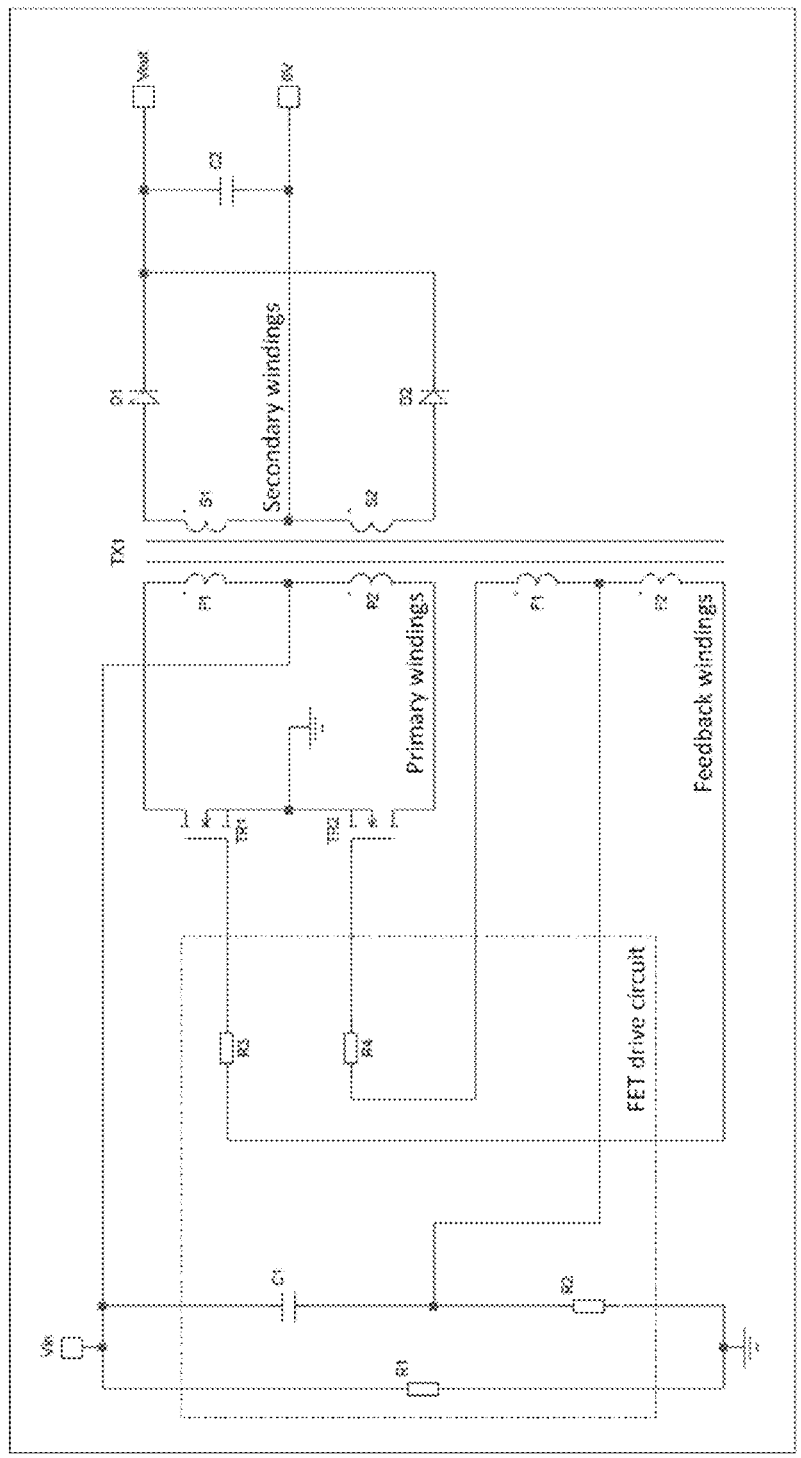
FIG. 1 is a circuit diagram of a saturating self-oscillating push-pull isolated DC-DC converter according to a preferred embodiment of the present invention.

FIG. 1 shows a saturating self-oscillating push-pull isolated DC-DC converter according to a preferred embodiment of the present invention. The saturating self-oscillating push-pull isolated DC-DC converter of FIG. 1 is sometimes referred to as a Royer oscillator. As shown in FIG. 1, the DC-DC converter includes an input voltage Vin, an output voltage Vout, and a transformer TX1 with first and second primary windings P1 and P2, first and second secondary windings S1 and S2, and first and second feedback windings F1 and F2. Diodes D1 and D2 rectify the voltage of the secondary windings S1 and S2, and an output capacitor C2 stores energy and smooths the rectified voltage.

As shown in FIG. 1, the DC-DC converter also includes a FET drive circuit with first through fourth resistors R1 to R4 and a capacitor C1 that provides voltages to drive FETs TR1 and TR2.

During start-up of the DC-DC converter, capacitor C1 initially begins to charge, which applies a DC bias voltage equal or substantially equal to the input voltage Vin at a center-tap of the feedback winding (i.e., the point between the first and second feedback windings F1 and F2). A positive DC bias voltage is applied to the gate terminals of the FETs TR1 and TR2, via the feedback windings F1 and F2 and the resistors R3 and R4. Due to inherent minor manufacturing differences (e.g., variations within normal manufacturing tolerances) between the FETs TR1 and TR2, one FET TR1 or TR2 may have a slightly lower gate threshold voltage $V_{GS(th)}$ which causes it to switch on first. Here, it is assumed that FET TR1 has a lower gate threshold voltage $V_{GS(th)}$ than FET TR2, such that FET TR1 turns on first.

As FET TR1 switches on, current flows through the first primary winding P1 and induces a magnetic field in the transformer TX1. This increases the magnetic flux of the transformer TX1 and results in voltages being induced in the second primary winding P2, the first and second secondary windings S1 and S2, and the first and second feedback windings F1 and F2. Accordingly, a negative voltage is induced across the first feedback winding F1, and a positive voltage is induced across the second feedback winding F2. The positive voltage across the second feedback winding F2 switches FET TR1 on, such that FET TR1 is in saturation mode, and the negative voltage across the first feedback winding F1 switches FET TR2 off, such that FET TR2 is in cut-off mode. During the cut-off mode of a FET, the FET is switched off such that there is no current or substantially no current flowing between the source and drain terminals of the FET. The voltage induced across the second primary winding P2 does not affect the operation of the DC-DC converter at this time because FET TR2 is switched off which prevents current from flowing through the second primary winding P2. When the capacitor C1 has fully charged (i.e., after start-up of the circuit), the DC bias voltage at the center-tap of the feedback winding (i.e., the point between the first and second feedback windings F1 and F2) is reduced to ground or substantially ground through resistor R1.

The drain current $I_{d(TR1)}$ of FET TR1 that flows in the first primary winding P1 increases with the magnetic flux in the core of the transformer TX1 until the core reaches saturation. When the magnetic flux within the core of the transformer TX1 reaches its peak value $B_{sat}$, the inductance of the first primary winding P1 falls to zero. Because the magnetic flux within the core of the transformer TX1 stops changing when it reaches its peak value $B_{sat}$, the magnitude of the voltages across the first and second feedback windings F1 and F2 fall to zero or substantially zero. This results in FET TR1 switching off, and causes the magnetic field induced by the first primary winding P1 to collapse, causing an opposing change in the magnetic flux of the transformer TX1. The switching of the FETs TR1 and TR2 then reverses, because a positive voltage is induced across the first feedback winding F1 and a negative voltage is induced across the second feedback winding F2. The positive voltage across the first feedback winding F1 switches FET TR2 on, and the negative voltage across the second feedback winding F2 switches FET TR1 off.

Figure 2:
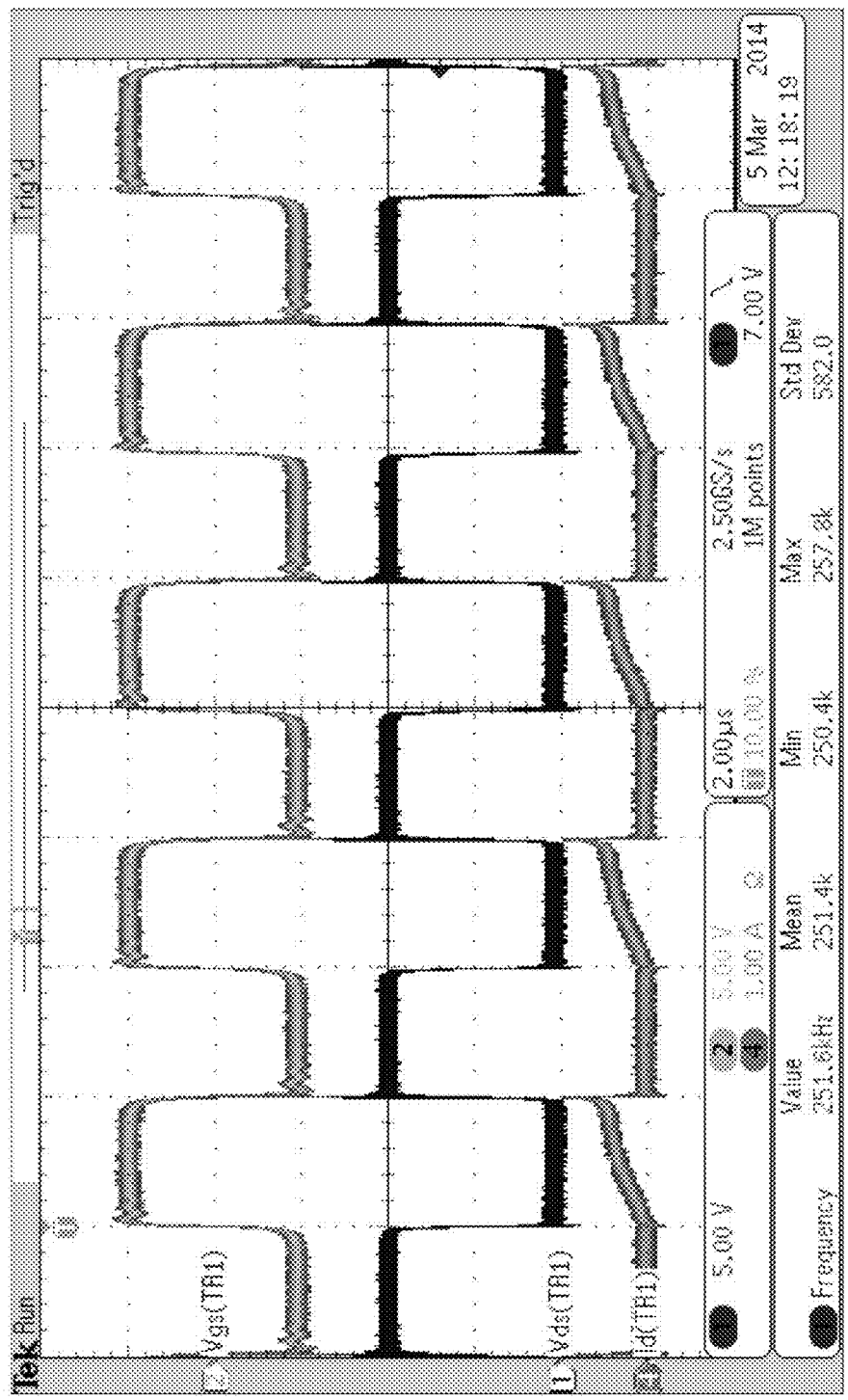
FIG. 2 shows oscilloscope traces associated with a transistor in the saturating self-oscillating push-pull isolated DC-DC converter of FIG. 1.

Because the gate terminals of the FETs TR1 and TR2 are driven by negative voltages when they are switched off, rather than simply applying no voltage or a voltage insufficient to drive the FETs TR1 and TR2 into saturation, the gate capacitances of the FETs TR1 and TR2 are quickly discharged, which results in the FETs TR1 and TR2 switching off quickly. FIG. 2 shows oscilloscope traces associated with FET TR1. As shown in FIG. 2, FET TR1 quickly turns on and off, providing a substantially square wave.

Current in the first and second primary windings P1 and P2 is limited by their DC resistances and by the drain-to-source on-resistance $R_{DS(on)}$ of the FETs TR1 and TR2. If the output voltage Vout is short-circuited or overloaded, the voltage across the first and second primary windings P1 and P2 drops, as the current demand at the load exceeds the current limit provided by the DC resistances of the first and second primary windings P1 and P2 and the drain-to-source on-resistance $R_{DS(on)}$ of the FETs TR1 and TR2. The voltages across the first and second feedback windings F1 and F2, and thus the voltages at the gate terminals of FETs TR1 and TR2, drops according to the lowered voltage across the first and second primary windings P1 and P2. Once the voltage at the gate terminals of the FETs TR1 and TR2 drops below both of their respective gate threshold voltages $V_{GS(th)}$, oscillation in the DC-DC converter ceases with only a minor amount of power being dissipated through resistor R1. However, the DC-DC converter only needs to once again go through the above-described start-up sequence to restart. Preferably, this is achieved by simply momentarily disconnecting the input voltage Vin so that capacitor C1 discharges via resistor R1.

Preferably, the FETs TR1 and TR2 have a low drain-to-source on-resistance $R_{DS(on)}$ to reduce losses and power dissipation. According to preferred embodiments of the present invention, the size of the output capacitor C2 is selected to significantly reduce or minimize load transients on the output voltage Vout, for example, to prevent the DC-DC converter from undesirably shutting down because of the load transients causing a short-circuit or overload condition.

The size of capacitor C1 sets the amount of time for the circuit to start. That is, larger values of the capacitor C1 increase the time that the positive DC bias voltage is applied to the gate terminals of the FETs TR1 and TR2 during start-up of the DC-DC converter. Resistor R1 discharges capacitor C1 when the input voltage Vin is disconnected, whereas resistor R2 allows capacitor C1 to charge and reduces the DC bias voltage on the gate terminals of FETs TR1 and TR2 to zero or substantially zero once capacitor C1 has charged. Higher values of resistor R1 and R2 reduce the quiescent power dissipation of the DC-DC converter. Resistors R3 and R4 dampen the voltage applied to drive the gate terminals of FETs TR1 and TR2 to reduce gate "ringing" due to the LC circuit defined by the inductances of the first and second feedback windings F1 and F2 and the intrinsic gate capacitances of the FETs TR1 and TR2. The values of resistors R3 and R4 are preferably large enough to reduce unwanted oscillations, but small enough to avoid excessive slewing of the gate-drive voltage. If the values of the resistors R3 and R4 are too high, the FETs TR1 and TR2 may be driven in their 'resistive' mode, which increases their power dissipation.

The turns ratios of the primary windings (i.e., the total turns of the first primary winding P1 and the second primary winding P2) and the feedback windings (i.e., the total turns of the first feedback winding F1 and the second feedback winding F2) on the transformer TX1 set the switching frequency and the gate-drive voltage of the FETs TR1 and TR2. The magnitude of the gate-drive voltage $V_{gs}$ is determined by the equation:

$$|V_{gs}| = \frac{V_p \times N_f}{N_p},$$

and the switching frequency f can be calculated by the equation:

$$f = \frac{V_p}{4 \times B \times N_p \times A_e},$$

where $V_p$ is the voltage at the primary winding, $N_f$ is the number of feedback turns, $N_p$ is the number of primary turns, B is the peak flux density of the transformer core, and $A_e$ is the effective cross-sectional area of the transformer core. The above equation for the switching frequency f is determined with respect to one-half of the primary winding, i.e., only one of the first primary winding P1 and the second primary winding P2. However, the first primary winding P1 preferably has the same number of turns as the second primary winding P2. Further, the first secondary winding S1 preferably has the same number of turns as the second secondary winding S2, and the first feedback winding F1 preferably has the same number of turns as the second feedback winding F2.

Accordingly, the DC-DC converter is able to operate at relatively high switching frequencies, although the range of switching frequencies is limited by various factors. For example, the range switching frequencies for the DC-DC converter is also limited by core losses, the values of resistors R3 and R4, the gate capacitances of the FETs TR1 and TR2, and the like.

According to the preferred embodiments of the present invention, the drain-to-source on-resistance $R_{DS(on)}$ of each of the FETs TR1 and TR2 has a positive thermal coefficient to provide a self-balancing effect in the push-pull arrangement of the DC-DC converter, stable operation of the DC-DC converter over a wide temperature range, and reliable start-up of the DC-DC converter even at low temperatures.

The preferred embodiments of the present invention can be applied to both N-channel FETs and P-channel FETs. If P-channel FETs are used, the supply rails of the input voltage Vin are reversed.

According to the preferred embodiments of the present invention, Zener diodes can be placed in parallel with gate and source terminals of the FETs TR1 and TR2 to clamp the maximum gate-drive voltage Vgs.

It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A converter comprising:
   a DC input;
   a transformer including first and second primary windings, first and second secondary windings, and first and second feedback windings;
   a first field-effect transistor;
   a second field-effect transistor; and
   a drive circuit connected to the first and second field-effect transistors, the drive circuit including:
      a bias circuit that includes a capacitor and a resistor connected in series across the DC input and ground and that applies a bias voltage to gates of the first and second field-effect transistors via the first and second feedback windings during start-up of the converter, wherein the bias voltage is reduced to zero or substantially zero after start-up of the converter; and
      a reset circuit that resets the bias circuit when the converter is turned off; wherein
   the converter is a self-oscillating push-pull DC-DC converter;
   a first terminal of the capacitor is connected to the DC input;
   a second terminal of the capacitor is connected to a first terminal of the resistor and a center-tap of the first and second feedback windings;
   the first terminal of the resistor is connected to the second terminal of the capacitor and the center-tap of the first and second feedback windings;
   a second terminal of the resistor is connected to ground; and
   the resistor reduces a voltage at the center-tap of the first and second feedback windings to ground or substantially to ground after the capacitor is fully charged.

2. The converter of claim 1, wherein the self-oscillating push-pull DC-DC converter is a Royer oscillator.

3. The converter of claim 1, wherein the reset circuit includes an additional resistor connected in parallel with the bias circuit between the DC input and ground.

4. The converter of claim 1, wherein the drive circuit further includes:
   a first resistor connected between the gate of the first field-effect transistor and the first feedback winding; and
   a second resistor connected between the gate of the second field-effect transistor and the second feedback winding.

5. The converter of claim 1, further comprising a capacitor connected to the first and second secondary windings.

6. The converter of claim 1, further comprising a rectifier circuit connected to the first and second secondary windings.

7. The converter of claim 6, wherein the rectifier circuit includes first and second diodes.

* * * * *